United States Patent
Park et al.

(10) Patent No.: US 12,422,875 B2
(45) Date of Patent: Sep. 23, 2025

(54) STRING OPTIMA FOR TRACKING EQUAL VOLTAGE IN UNITS OF STRINGS, AND SOLAR POWER GENERATION SYSTEM TO WHICH SAME IS APPLIED

(71) Applicants: SMART POWER CO., LTD., Gimpo-si (KR); Ki Ju Park, Seoul (KR)

(72) Inventors: Ki Ju Park, Seoul (KR); Kyung Mun Lee, Busan (KR); Sae Hee Park, Seoul (KR)

(73) Assignees: SMART POWER CO., LTD., Gimpo-si (KR); Ki Ju Park, Seoul (KR)

( * ) Notice: Subject to any disclaimer, the term of this patent is extended or adjusted under 35 U.S.C. 154(b) by 257 days.

(21) Appl. No.: 18/269,580

(22) PCT Filed: Dec. 24, 2021

(86) PCT No.: PCT/KR2021/019882
§ 371 (c)(1),
(2) Date: Jun. 26, 2023

(87) PCT Pub. No.: WO2022/145907
PCT Pub. Date: Jul. 7, 2022

(65) Prior Publication Data
US 2024/0053786 A1    Feb. 15, 2024

(30) Foreign Application Priority Data

Dec. 31, 2020   (KR) .................. 10-2020-0189458
Nov. 16, 2021   (KR) .................. 10-2021-0157971

(51) Int. Cl.
*G05F 1/67*   (2006.01)
*H02J 3/38*   (2006.01)
*H02S 40/32*   (2014.01)

(52) U.S. Cl.
CPC ............... *G05F 1/67* (2013.01); *H02J 3/381* (2013.01); *H02S 40/32* (2014.12); *H02J 2300/26* (2020.01)

(58) Field of Classification Search
CPC .... G05D 1/67; H02S 40/32; H02J 3/38; H02J 3/381; H02J 2300/26
See application file for complete search history.

(56) References Cited

U.S. PATENT DOCUMENTS

2009/0284078 A1   11/2009   Zhang et al.
2020/0303924 A1   9/2020    Moslehi et al.

FOREIGN PATENT DOCUMENTS

KR   10-2011-0009233 A   1/2011
KR   10-2013-0041416 A   4/2013
(Continued)

OTHER PUBLICATIONS

International Search Report for PCT/KR2021/019882 mailed Apr. 7, 2022 from Korean Intellectual Property Office.

*Primary Examiner* — Robert L Deberadinis
(74) *Attorney, Agent, or Firm* — Revolution IP, PLLC

(57) ABSTRACT

A photovoltaic power generation system includes a plurality of solar cell strings each including a plurality of photovoltaic PV modules, a plurality of string optimizers each connected to an output terminal of each of the plurality of solar cell strings, an inverter configured to automatically track an MPP from an equal voltage output from each of the plurality of string optimizers, inverts a result thereof into AC power, and links the AC power to the system, wherein the string optimizer includes an input processor configured to receive input of generated power from any first solar cell string, a booster configured to boost or bypass generated power input through the input processor, and output the generated power, an output processor configured to output an output of the (Continued)

booster to a back end, and an MCU configured to perform MPPT in units of strings to control an operation of the booster.

17 Claims, 6 Drawing Sheets

(56) References Cited

FOREIGN PATENT DOCUMENTS

| KR | 10-2013-0133413 A | 12/2013 |
| KR | 10-1491744 B1 | 2/2015 |
| KR | 10-2020-0142866 A | 12/2020 |

STRING OPTIMA FOR TRACKING EQUAL VOLTAGE IN UNITS OF STRINGS, AND SOLAR POWER GENERATION SYSTEM TO WHICH SAME IS APPLIED

CROSS REFERENCE TO PRIOR APPLICATIONS

This application is the 35 U.S.C. 371 national stage of international application PCT/KR2021/019882 filed on Dec. 24, 2021 which claims priority to Korean Patent Application Nos. 10-2020-0189458 filed on Dec. 31, 2020 and 10-2021-0157971 filed on Nov. 16, 2021. The entire contents of each of the above-identified applications are hereby incorporated by reference.

TECHNICAL FIELD

The present invention relates to a photovoltaic power generation system, and more particularly to a string optimizer that tracks an equal voltage in units of strings using an output voltage or a current value for each string of a photovoltaic (PV) array, and a photovoltaic power generation system to which the string optimizer is applied.

BACKGROUND ART

In general, photovoltaic power generation has a disadvantage of low power production efficiency compared to high power generation costs. However, with reduction of fossil energy and increasing environmental demands for non-pollution, a lot of studies have currently been conducted to improve efficiency of photovoltaic power generation. Currently, a ratio of electrical energy that may be converted from energy received from the sun through a solar cell is only about 15 to 20% of the total solar energy.

Specifically, since an output of a solar cell that generates photovoltaic power is significantly small, to obtain required output, several solar cells are connected in series to form a PV module, and PV modules are connected in series or parallel again to form a PV array.

The voltage magnitude of the PV array is proportional to the number of PV modules connected in series, and the current magnitude of the PV array is proportional to the number of lines connected in parallel.

Meanwhile, a photovoltaic power generation device has more difficulty stably supplying electricity than other power generation methods since an output value of a solar cell varies depending on the surrounding environment.

In other words, the photovoltaic power generation device has a characteristic in which the output of the solar cell nonlinearly changes in voltage and current depending on the surrounding environment such as insolation, temperature, and clouds.

In order to improve low efficiency and unstable power supply of the solar cell, the most fundamental measure is to improve the efficiency by increasing performance of the solar cell. However, it is difficult to make clear improvements with the current technology.

Therefore, in order to increase competitiveness of photovoltaic power generation, it is important to improve efficiency by increasing performance of the power generation device. However, in order to maintain efficiency of photovoltaic power generation, a system capable of stably maintaining maximum output is required, and maximum power point tracking (MPPT) control is essential to produce maximum output.

FIG. 1 is a schematic configuration diagram of a photovoltaic power generation device according to a conventional art.

Referring to FIG. 1, the photovoltaic power generation device according to the conventional art includes a PV array 10A in which a plurality of PV modules 10 is connected in series and parallel, a connection board 30, and an inverter 40.

The PV module 10 converts sunlight into DC power and transmits the DC power to the inverter 40 through the connection board 30, and the inverter 40 serves to invert DC power generated through each PV module 10 into AC power so that the power may be linked to a system.

Here, the PV modules 10 are connected in series and parallel according to capacity of the photovoltaic power generation device. The PV modules 10 are connected in series to form one string 20, and strings are connected in parallel to form the PV array 10A.

The connection board 30 includes a string optimizer and a backflow prevention diode, and the string optimizer collects voltages of the PV array 10A, integrates power from a plurality of PV arrays 10A through the backflow prevention diode, and supplies the power to an input terminal of the inverter 40.

In the photovoltaic power generation device according to the conventional art configured as described above, power generated from each PV module 10 is transmitted to the inverter 40 through the connection board 30, and the inverter 40 controls MPPT to generate power.

Meanwhile, MPPT control is performed in the inverter 40, which performs a function of automatically tracking a maximum power point (MPP) as an operating point of the photovoltaic power generation device.

However, such a conventional photovoltaic power generation device has a problem in that output voltages of the string optimizer are not equal to each other when MPPT is controlled by the inverter, and thus efficiency is relatively poor.

As a conventional art for solving such a problem, Korean Patent Publication No. 10-2013-0133413 discloses a photovoltaic power generation device including a photovoltaic module configured to generate electrical energy from sunlight, a booster for raising electrical energy from the photovoltaic module to an appropriate voltage level required for operation of an inverter to be connected at a rear end, a switch connected in parallel with the booster, and an inverter for receiving an output of the booster and inverting the output into AC power to be delivered to a power system, etc.

According to the above patent, the switch is electrically connected in parallel with the booster to form two paths between the photovoltaic module and the inverter, and such a conventional photovoltaic power generation device merely operates the switch when the booster is not operating to prevent energy loss, and has a problem in that an equal voltage cannot be output.

DISCLOSURE

Technical Problem

Therefore, to solve the above problem, the present invention provides a string optimizer capable of effectively solving output imbalance of a solar cell according to environmental factors (for example, sunrise, sunset, clouds, ice, snow, etc.) and stably maintaining a maximum output of the solar cell (for example, output under maximum insolation) by further performing string MPPT control for tracking an equal voltage in units of strings using a current value for each string of a PV array before inverter control MPPT performed at an inverter terminal of a photovoltaic power generation system, and the photovoltaic power generation system to which the string optimizer is applied.

In addition, the present invention provides a string optimizer capable of effectively solving output imbalance of a solar cell and enabling stable electricity supply by string optimizers corresponding to solar cell strings, respectively, mutually sharing respective output currents of the corresponding solar cell strings and boosting an output current of a solar cell string having a low output current based on a result of sharing, and a photovoltaic power generation system to which the string optimizer is applied.

In addition, the present invention provides a string optimizer capable of solving regional imbalance in generated power of a photovoltaic power generation system by monitoring an operating state of the photovoltaic power generation system at a remote location through an external network and interworking with a monitoring system controlling an operation thereof, and the photovoltaic power generation system to which the string optimizer is applied.

In addition, the present invention provides a string optimizer capable of outputting an equal voltage, which maximizes efficiency of the string optimizer to enhance power generation efficiency by self-boosting or bypassing an output voltage for each string optimizer in response to an inverter requesting a tracking voltage of the string optimizer according to MPP tracking for MPPT control, so that the output voltage is bypassed when the output voltage is greater than an output voltage of another string optimizer and the output voltage is boosted when the output voltage is less than an output voltage of another string optimizer, thereby outputting an optimal equal voltage in accordance with the output voltage of the other string optimizer.

Technical Solution

In accordance with an aspect of the present invention, the above and other objects can be accomplished by the provision of a string optimizer connected between an inverter and an output terminal of each of a plurality of solar cell strings included in a photovoltaic power generation system to output an equal voltage, the string optimizer including an input processor configured to receive input of generated power from any first solar cell string, a booster configured to boost or bypass generated power input through the input processor, and output the generated power, an output processor configured to output an output of the booster to a back end, and a main controller unit (MCU) configured to perform maximum power point tracking (MPPT) in units of strings to control an operation of the booster so that a voltage corresponding to a maximum current value among current values each detected from an output of each of the plurality of solar cell strings tracks the equal voltage.

In accordance with another aspect of the present invention, there is provided a photovoltaic power generation system including a plurality of solar cell strings each including a plurality of photovoltaic (PV) modules, a plurality of string optimizers each connected to an output terminal of each of the plurality of solar cell strings to perform MPPT in units of the solar cell strings so that an output of a corresponding solar cell string tracks a voltage corresponding to a maximum current value among current values of the plurality of respective solar cell strings as an equal voltage, and an inverter configured to automatically track a maximum power point (MPP) from an equal voltage output from each of the plurality of string optimizers, inverts a result thereof into AC power, and links the AC power to the system, wherein the string optimizer includes an input processor configured to receive input of generated power from any first solar cell string, a booster configured to boost or bypass generated power input through the input processor, and output the generated power, an output processor configured to output an output of the booster to a back end, and an MCU configured to perform MPPT in units of strings to control an operation of the booster so that a voltage corresponding to a maximum current value among current values each detected from an output of each of the plurality of solar cell strings tracks the equal voltage.

In accordance with a further aspect of the present invention, there is provided a string optimizer used for a photovoltaic power generation system including a PV array including a plurality of PV modules and a plurality of solar cell strings, a connection board provided with a plurality of string optimizers, and an inverter configured to automatically track an MPP, wherein, when the inverter requests a tracking voltage according to MPPT for MMPT control, each of the string optimizers bypasses an output voltage of each of the string optimizers when the output voltage is greater than or equal to a maximum output voltage among output voltages of the plurality of string optimizers connected in parallel and boosts the output voltage when the output voltage is less than the maximum output voltage, thereby outputting the same equal voltage as the maximum output voltage of the string optimizers.

Advantageous Effects

A string optimizer of the present invention and a photovoltaic power generation system to which the string optimizer is applied have effects of being able to effectively solve output imbalance of a solar cell according to environmental factors (for example, sunrise, sunset, clouds, ice, snow, etc.) and stably maintain a maximum output of the solar cell (for example, output under maximum insolation) by further performing string MPPT control for tracking an equal voltage in units of strings using a current value for each string of a PV array before inverter control MPPT performed at an inverter terminal of the photovoltaic power generation system.

In addition, the present invention has effects of being able to effectively solve output imbalance of a solar cell and enable stable electricity supply by string optimizers corresponding to solar cell strings, respectively, mutually sharing respectively output currents of the corresponding solar cell strings and boosting an output current of a solar cell string having a low output current based on a result of sharing.

In addition, the present invention has effects of being able to solve regional imbalance in generated power of a photovoltaic power generation system by monitoring an operating state of the photovoltaic power generation system at a remote location through an external network and interworking with a monitoring system controlling an operation thereof.

In addition, the present invention may maximize efficiency of a string optimizer to enhance power generation efficiency by self-boosting or bypassing an output voltage for each string optimizer in response to an inverter requesting a tracking voltage of the string optimizer according to MPP tracking for MPPT control, so that the output voltage is bypassed when the output voltage is greater than an output voltage of another string optimizer and the output voltage is boosted when the output voltage is less than an output voltage of another string optimizer, thereby outputting an optimal equal voltage in accordance with the output voltage of the other string optimizer.

BEST MODE

Figure 1:
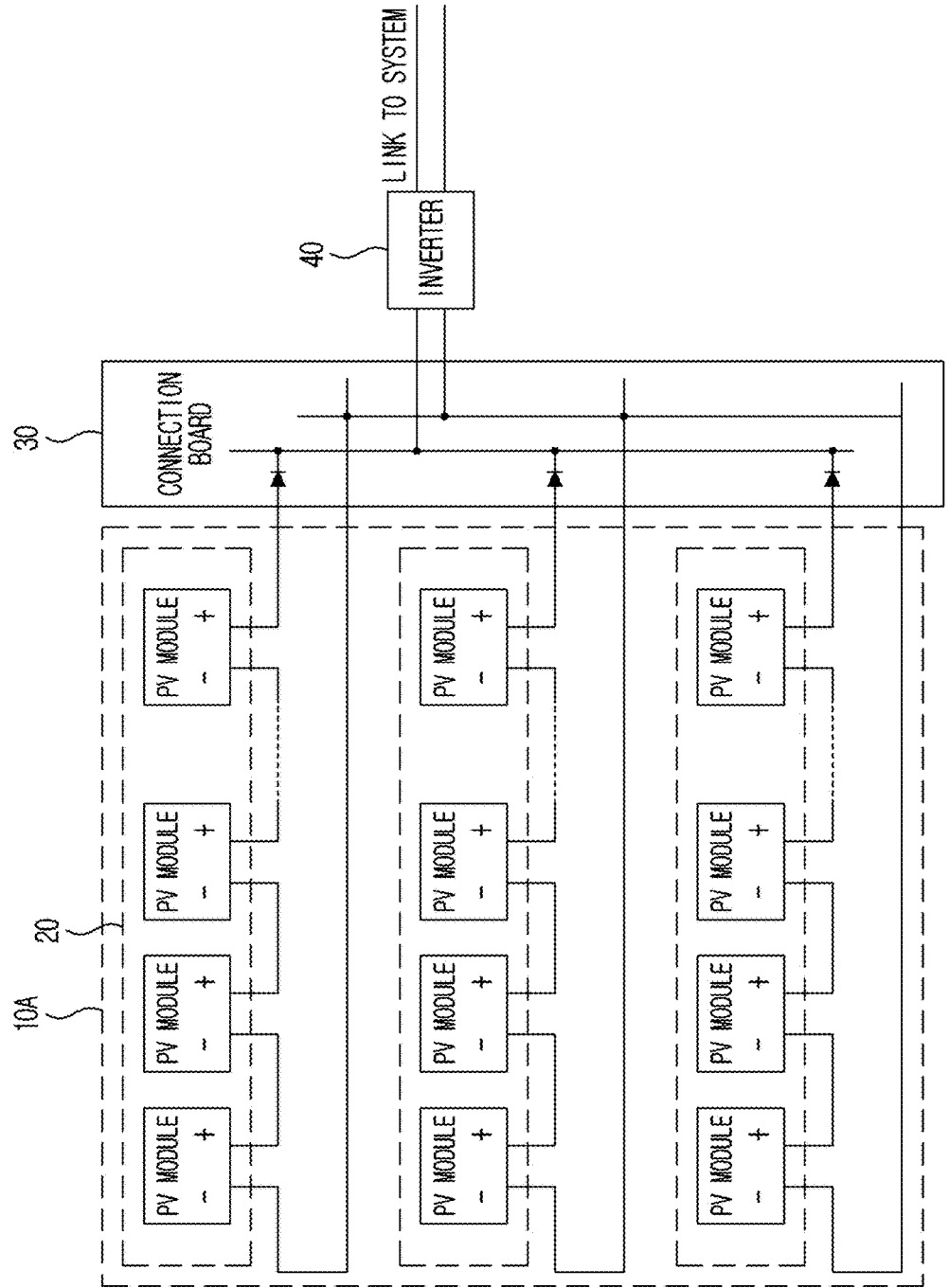
FIG. 1 is a configuration diagram schematically illustrating a photovoltaic power generation device according to an embodiment of a conventional art.

Hereinafter, embodiments of the present invention will be described with reference to the accompanying drawings, and will be described in detail so that those skilled in the art may easily practice the present invention. However, the present invention may be embodied in many different forms and is not limited to the embodiments described herein. Meanwhile, in order to clearly describe the present invention in the drawings, parts irrelevant to the description are omitted, and similar reference numerals are attached to similar parts throughout the specification. In addition, descriptions of parts that may be easily understood by those skilled in the art even when detailed descriptions are omitted are omitted.

Throughout the specification and claims, when a part is described as including a certain component, this description means that the part may further include other components, not excluding other components, unless stated otherwise.

Figure 2:
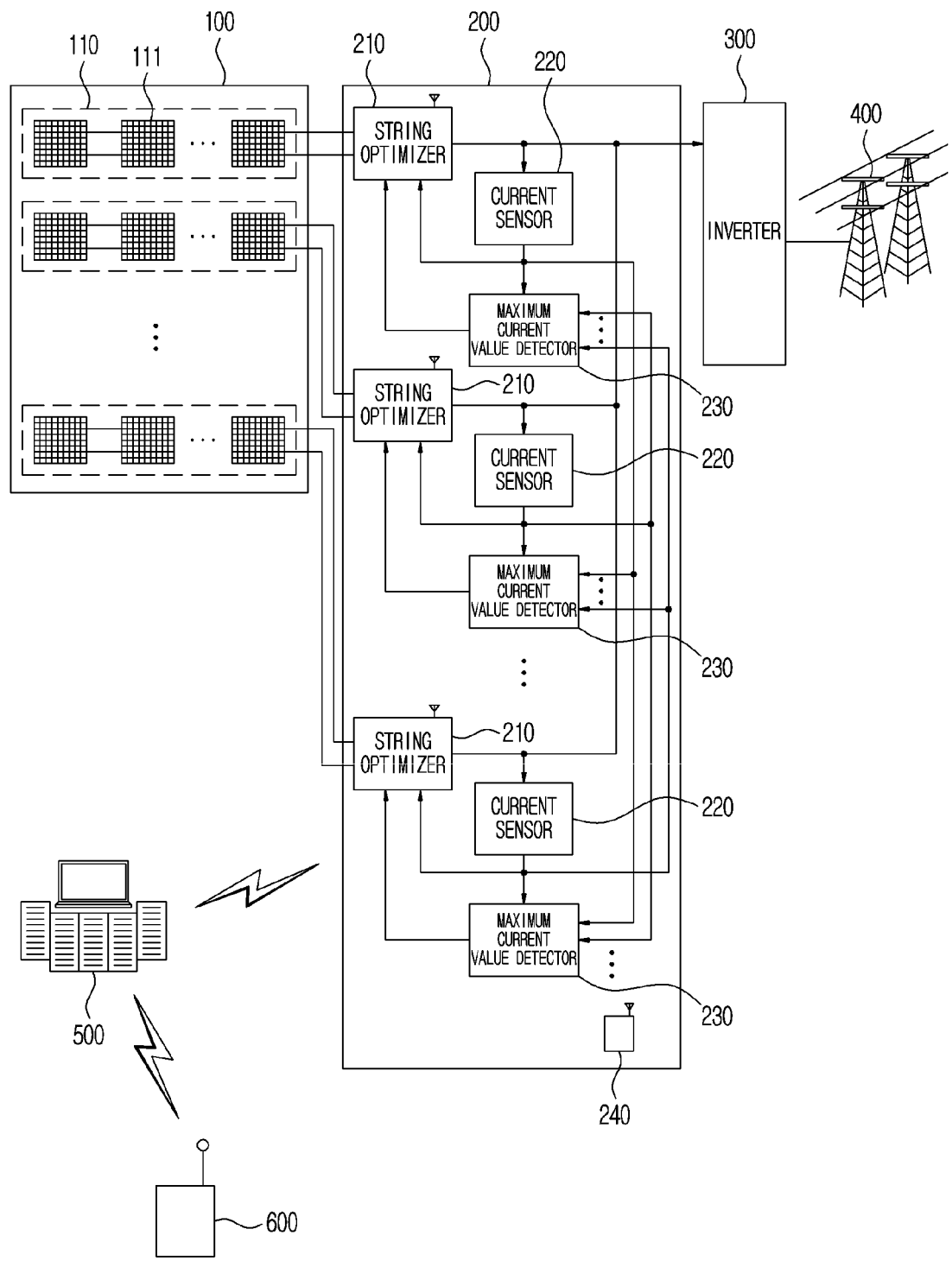
FIG. 2 is a diagram schematically illustrating a photovoltaic power generation system according to an embodiment of the present invention.

FIG. 2 is a diagram schematically illustrating a photovoltaic power generation system according to an embodiment of the present invention.

Referring to FIG. 2, the photovoltaic power generation system according to the embodiment of the present invention may include a PV array 100, a connection board 200 including a string optimizer 210, an inverter 300, a power system 400, and a monitoring system 500.

The PV array 100 includes a plurality of solar cell strings 110 each including a plurality of solar cell modules 111.

The connection board 200 is connected between the PV array 100 and the inverter 300, and the string optimizer 210 included in the connection board 200 is connected between an output terminal of one of the solar cell strings 110 and the inverter, outputs an equal voltage after boosting generated power for each of the solar cell strings 110, and tracks the equal voltage in units of strings using a current value of each of the solar cell strings 110.

To this end, the connection board 200 may include a plurality of string optimizers 210, a plurality of current sensors 220, maximum current value detectors 230, and an integration controller 240.

The plurality of string optimizers 210 corresponds to the plurality of solar cell strings 110, respectively, and boosts generated power of corresponding solar cells, so that MPPT may be performed in units of the solar cell strings 110. A more detailed description of the string optimizers 210 will be given later with reference to FIG. 3.

The current sensors 220 are connected to output terminals of the respective string optimizers 210, measure current values from an output of the corresponding string optimizers 210, and feed back the measured current values (hereinafter, referred to as measurement current values) to the string optimizers 210. At this time, the current sensors 220 output the measured current values as voltages. As illustrated in FIG. 2, the current sensors 220 may be connected to the output terminals of the string optimizers 210 to measure current values from an output of the corresponding string optimizers 210, or may be provided inside the string optimizers 210.

The maximum current value detectors 230 receive current values each measured from an output of each of the plurality of solar cell strings 110, compare the input current values with the measurement current values, and detect a maximum current value. To this end, the maximum current value detector 230 may output only the maximum current value by connecting the input current values and the measurement current values based on an OR concept. For example, the maximum current value detector 230 may be configured such that only a high voltage is output by connecting a diode so that a cathode and an anode are formed for each solar cell string 110.

The integration controller 240 is connected to the plurality of string optimizers 210 through a communication network (for example, a wired/wireless communication network), and integrates and manages operations of the plurality of string optimizers 210. A more detailed description of the integration controller 240 will be described later with reference to FIG. 4.

The inverter 300 automatically tracks the maximum power point from the equal voltage output from each of the plurality of string optimizers 210, inverts a result thereto into AC power, and links the AC power to the power system 400.

The monitoring system 500 communicates with the photovoltaic power generation system through an external network (for example, a wired/wireless Internet network, etc.), and may monitor an operating state of the photovoltaic power generation system from a remote location, or control an operation of the photovoltaic power generation system. For example, the monitoring system 500 may communicate with a plurality of photovoltaic power generation systems through an external network, and control the amount of power generated by the photovoltaic power generation systems for each region in consideration of an operating state of each photovoltaic power generation system and an environmental state of each region where a corresponding photovoltaic power generation system is constructed (for example, insolation, temperature, humidity, etc.).

In particular, the monitoring system 500 may communicate with the integration controller 230 to monitor output efficiency of each of the solar cell strings 110, and control an operation of a corresponding string optimizer 210 so that an output of a solar cell string 110 having relatively low output is boosted.

At this time, the monitoring system 500 communicates with a portable terminal device (for example, a smartphone, etc.) 600 of a manager through a wireless network (for example, Wi-Fi network, etc.), and may transmit monitoring information and control information of the photovoltaic power generation system to the portable terminal device 600, or generate and deliver a control signal for controlling a corresponding photovoltaic power generation system based on selection information of the manager delivered through the portable terminal device 600.

Figure 3:
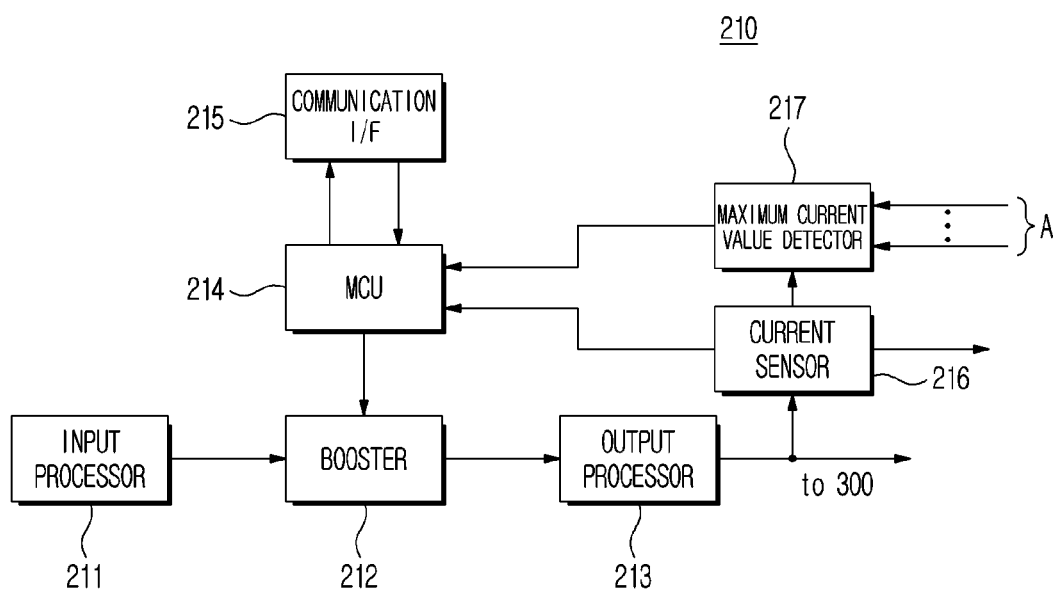
FIG. 3 is a schematic block diagram of a string optimizer according to an embodiment of the present invention.

FIG. 3 is a schematic block diagram of a string optimizer according to an embodiment of the present invention. Referring to FIGS. 2 and 3, the string optimizer 210 according to the embodiment of the present invention includes an input processor 211, a booster 212, an output processor 213, a main controller unit (MCU) 214, a communication interface (I/F) 215, a current sensor 216, and a maximum current value detector 217.

The input processor 211 receives input of generated power output from the solar cell string 110.

The booster 212 boosts or bypasses the generated power input through the input processor 211 and outputs the generated power. To this end, the booster 212 may be controlled by the MCU 214, and the MCU 214 may control the booster 212 after comparing a current value of generated power output from a corresponding solar cell string 110 with a current value of generated power output from another neighboring solar cell string 110 and determining whether to perform boosting.

The output processor 213 may output the output of the booster 212 to a back end. That is, the output processor 213 may deliver the output of the booster 212 to the inverter 300 side.

The MCU 214 operates based on a preset processing algorithm to control the operation of the string optimizer 210. In particular, the MCU 214 controls MPPT in units of strings. To this end, the MCU 214 may measure an output voltage and current of the solar cell string 110 corresponding to the generated power input through the input processor 211, and control an operation of the booster 212 so that a voltage corresponding to a maximum current value among current values each detected from an output of each of the plurality of solar cell strings tracks the equal voltage. To this end, the MCU 214 may receive current values measured from the current sensor 216 (or the current sensor 220 of FIG. 2) (hereinafter referred to as "measurement current values") and a maximum current value detected by the maximum current value detector 217, and perform MPPT by controlling an operation of the booster 212 based on the measurement current values and the maximum current value. At this time, as the maximum current value detector 230 mentioned in the description with reference to FIG. 2, the maximum current value detector 217 receives input of measured current values A each measured from an output of each of the plurality of solar cell strings 110, compares the input current values with the measurement current values, and detects a maximum current value. To this end, the maximum current value detector 230 may output only the maximum current value by connecting the input current values and the measurement current values based on an OR concept. For example, the maximum current value detector 230 may be configured such that only a high voltage is output by connecting a diode so that a cathode and an anode are formed for each solar cell string 110.

The MCU 214 receiving the measurement current values and the maximum current value compares the measurement current values with the maximum current value, and performs MPPT by controlling the booster 212 so that, when a difference between the values is greater than or equal to a preset reference value (for example, 0.5 A), an output of a corresponding solar cell is boosted.

The communication I/F 215 provides a communication interface for mutual communication so that each of the plurality of string optimizers 210 included in the connection board 200 may share necessary information with each other. That is, the communication I/F 215 provides an interface for communication between different string optimizers 210 connected to respective output terminals of different solar cell strings. In other words, MCUs 214 of the plurality of respective string optimizers 210 may mutually share current values detected from an output of the corresponding solar cell strings 110 through communication I/Fs 215, and each of the MCUs 214 may determine whether or not the booster 212 performs boosting based on a comparison result of the values.

For example, when the PV array includes first to nth solar cell strings, and first to nth string optimizers are connected to the first to nth solar cell strings, respectively, MCUs (that is, first to nth MCUs) of the respective first to nth string optimizers mutually share first to nth current values detected from an output of the corresponding first to nth solar cell strings through the communication I/Fs, and may determine whether to perform boosting based on the mutually shared current values.

At this time, the first to nth current values are connected based on an OR concept so that only a voltage corresponding to the largest current value is output. Thus, the respective MCUs may share a highest voltage among voltages of currents each for an output of each of the first to nth solar cell strings, and whether to perform boosting may be determined based on the maximum value or whether to perform boosting may be determined by comparing the respective current values. For example, the first MCU may compare a voltage for a first current value, which is a current value of the first MCU, with a voltage value for the maximum current value mutually shared with other MCUs (that is second to nth MCUs), and perform a control operation to boost an output of a corresponding solar cell string when a voltage for a current value (that is the first current value) detected from the corresponding solar cell string (that is, the first solar cell string) is less than a voltage for the maximum current value, and a difference therebetween exceeds a preset reference value (for example, 0.5 A).

Alternatively, the first MCU may perform a control operation to boost an output of the first solar cell string when the first current value detected from an output of the corresponding first solar cell string is less than current values (that is, second to nth current values) detected from respective string optimizers (that is, second to nth string optimizers) connected to respective solar cell strings other than the first solar cell string (that is, second to nth solar cell strings) by a predetermined value or more.

Alternatively, the first MCU may perform a control operation to boost an output of the first solar cell string when the first current value is less than an average value of the current values (that is, first to nth current values) detected from all the respective string optimizers (that is, first to nth string optimizers) by a predetermined value or more.

Alternatively, the first MCU may perform a control operation to boost an output of the first solar cell string when the first current value is a minimum value among the current values (that is, first to nth current values) detected from all the respective string optimizers (that is, first to nth string optimizers).

That is, when the illustrated condition is satisfied, the first string optimizer may boost and output the output of the first solar cell string.

Figure 4:
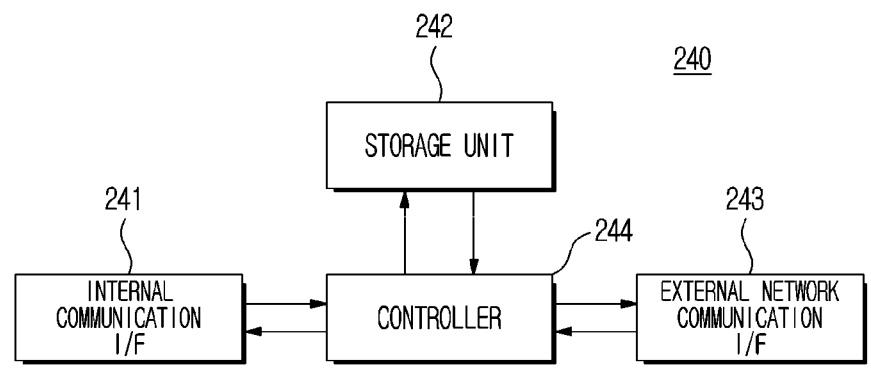
FIG. 4 is a schematic block diagram of an integration controller according to an embodiment of the present invention.

FIG. 4 is a schematic block diagram of the integration controller according to an embodiment of the present invention. Referring to FIGS. 2 to 4, the integration controller 240 according to the embodiment of the present invention includes an internal communication I/F 241, a storage unit 242, an external network communication I/F 243, and a controller 244.

The internal communication I/F 241 provides a communication interface between internal devices of the connection board 200. In particular, the internal communication I/F 241 provides a communication interface with a plurality of string optimizers 210 to receive state information of each of the plurality of string optimizers 210, and may receive a current value detected from an output of a solar cell string to which each of the string optimizers 210 corresponds.

The storage unit 242 stores a control algorithm set in advance to integrate and manage an operation of each of the plurality of string optimizers 210 and data received from each of the plurality of string optimizers 210, and may store a real-time measurement current value received from each of the plurality of string optimizers 210.

The external network communication I/F 243 provides an interface with an external network (for example, Wi-Fi, etc.), and provides a communication interface between the monitoring system 500 and the integration controller 240 connected through an external network. In particular, the external network communication I/F 243 may deliver state information of each of the plurality of string optimizers 210 received through the internal communication I/F 241 to the monitoring system 500, and may receive control signals for controlling the operations of the plurality of string optimizers 210 from the monitoring system 500 and deliver the control signals to the controller 244.

The controller 244 controls the operation of each of the plurality of string optimizers 210 based on information stored in the storage unit 242. In particular, the controller 244 may control boosting or MPPT of each of the string optimizers 210. In particular, the controller 244 may predict power generation efficiency of each of the solar cell strings based on a comparison result of real-time measurement current values each received from each of the plurality of string optimizers 210, and control a boosting operation of each of the string optimizers based on a result thereof.

For example, when the connection board 200 includes n string optimizers 210, the controller 244 receives a real-time measurement current value from each of the n string optimizers 210, compares received values, and predicts power generation efficiency of each of the solar cell strings, and may predict that power generation efficiency of a solar cell string, in which a current value less than an average value of all the real-time measurement current values by a predetermined value or more is measured, or a solar cell string, in which the real-time measurement current value is the minimum among all the real-time measurement current values, is low, and perform a control operation to boost an output of the solar cell string having low power generation efficiency. That is, the controller 244 may generate a control signal for control and transmit the control signal to the corresponding string optimizer 210 through the internal communication I/F 241.

In addition, the controller 244 may receive a remote control signal delivered from the monitoring system 500 through the external network communication I/F 243, and control an operation of each of the string optimizers 210 based on the remote control signal. As described above, as a characteristic, the photovoltaic power generation system of the present invention may be controlled by the monitoring system 500 that remotely monitors operations of photovoltaic power generation systems for each region, thereby solving power imbalance between regions.

Figure 5:
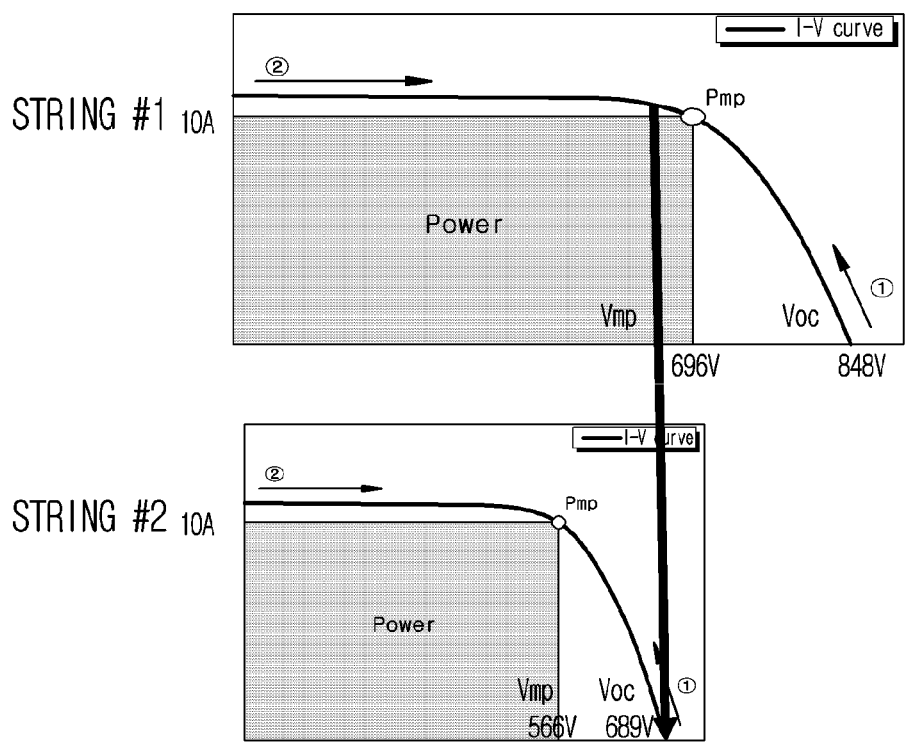
FIGS. 5 and 6 are graphs for describing performance improvement effect of the photovoltaic power generation system according to an embodiment of the present invention.
Figure 6:
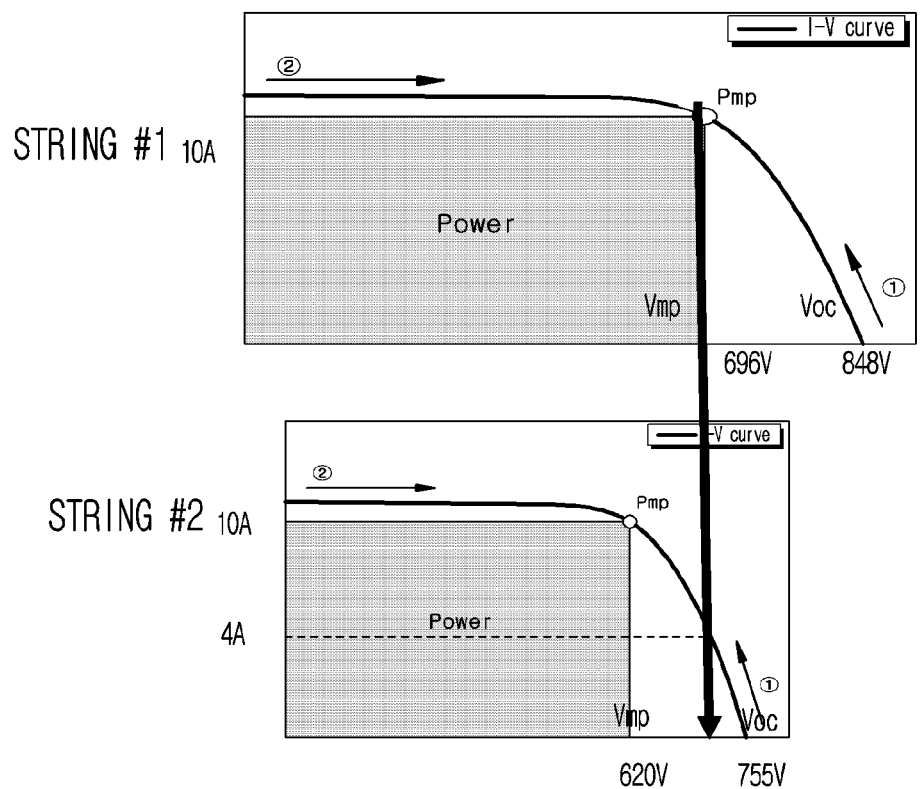

FIGS. 5 and 6 are graphs for describing performance improvement effects of the photovoltaic power generation system according to an embodiment of the present invention and illustrate PV graphs of the photovoltaic power generation system when a voltage is different for each string. FIG. 5 is a PV graph for describing a result of tracking an equal voltage using a voltage for each string, and FIG. 6 is a PV graph for describing MPPT in units of strings.

Referring to FIG. 5, when a solar cell string (string #1) having a maximum voltage Vmp of 696 V and an open-circuit voltage Voc of 848 V and a solar cell string (string #2) having a maximum voltage Vmp of 566 V and an open-circuit voltage Voc of 689 V are connected in parallel, the inverter controls MPPT by scanning a voltage by MPPT at 848 V and lowering the voltage while raising a required current. At this time, the inverter determines that 696 V, which is the maximum voltage Vmp of string #1, as an MPP, and an output of string #2 is not generated since an output voltage does not reach the open-circuit voltage Voc of string #2. That is, in the conventional case, as illustrated in FIG. 5, string #1 and string #2 having different voltages for each string are connected in parallel, and a difference in maximum voltage Vmp between string #1 and string #2 is 130 V or more, the inverter generates power near 696 mV, which is a maximum point of string #1, and string #2 does not generate power.

Meanwhile, referring to FIG. 6, when a solar cell string (string #1) having a maximum voltage Vmp of 696 V and an open-circuit voltage Voc of 848 V and a solar cell string (string #2) having a maximum voltage Vmp of 620 V and an open-circuit voltage Voc of 755 V are connected in parallel, as in the example of FIG. 5, the inverter controls MPPT by scanning a voltage by MPPT at 848 V and lowering the voltage while raising a required current, and, as a result, the inverter determines that 696 V, which is the maximum voltage Vmp of string #1, as an MPP. However, in the example of FIG. 6, even though an output voltage of string #2 is lower than an output voltage of string #1, a current of about 4 A flows through string #2 at a point of the maximum voltage Vmp where a current of string #1 is 10 A. Therefore, sending an output of MPPT for string #2 allows maximum power generation at Vmp in string #2. That is, when the inverter generates power near Vmp 696 V, which is the maximum point of string #1, by connecting string #1 and string #2 having different output voltages in parallel as in FIG. 6, if the present invention is applied, maximum power may be tracked by performing boosting at the maximum voltage 620 V (Vmp) in string #2 in addition to string #1 to generate power at 696 V.

In addition, the present invention uses a current value for each output to track an equal voltage in units of strings, current values are mutually shared through communication or connection lines connected based on an OR concept between string optimizers connected for each solar cell string, and an output of a string having poor output efficiency is boosted. In this way, there is effect of allowing all strings to participate in power generation as illustrated in FIG. 6.

As described above, the present invention has a characteristic in that output imbalance of solar cells according to environmental factors such as sunrise, sunset, clouds, ice, and snow is solved, and outputs of solar cells are stably maintained in a maximum insolation state by tracking an equal voltage in units of strings using a current value for each string of the PV array.

Figure 7:
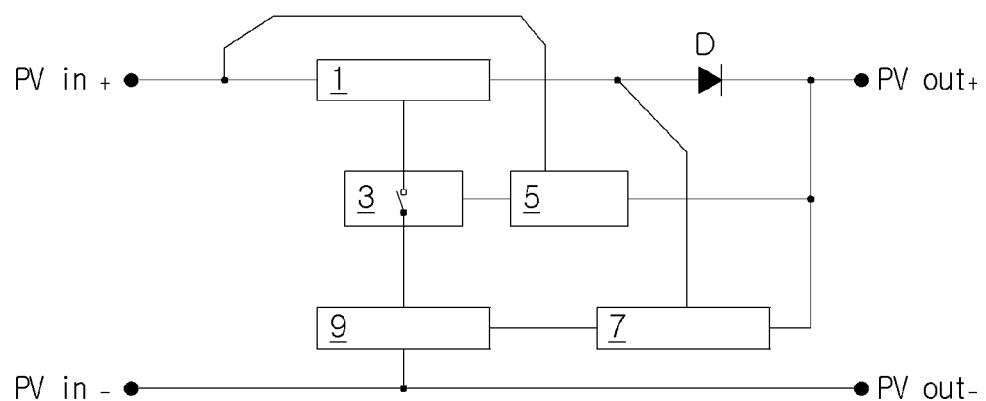
FIG. 7 is a configuration diagram schematically illustrating a string optimizer capable of outputting an equal voltage according to another embodiment of the present invention.
Figure 8:
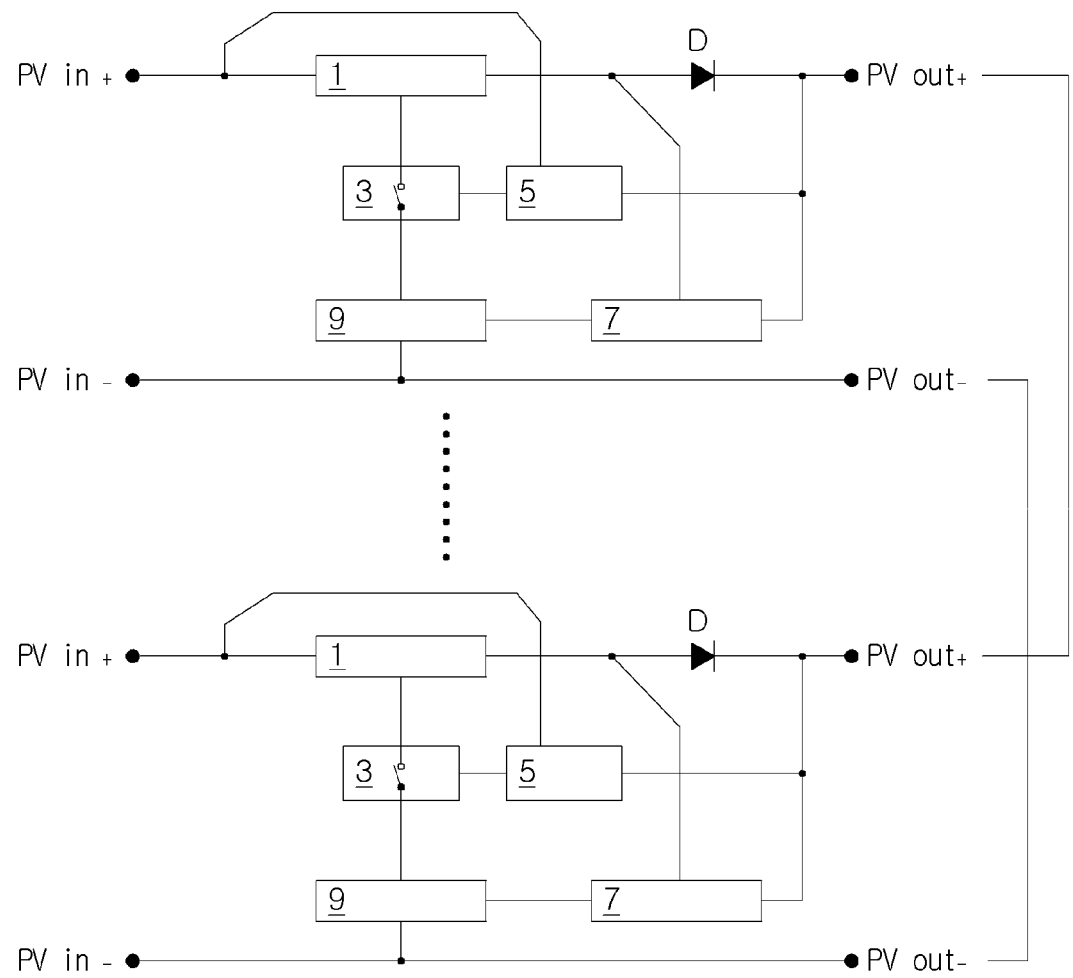
FIG. 8 is a configuration diagram illustrating a state in which string optimizers, each capable of outputting an equal voltage, are connected in parallel according to another embodiment of the present invention.

FIG. 7 is a configuration diagram schematically illustrating a string optimizer capable of outputting an equal voltage according to an embodiment of the present invention, and FIG. 8 is a configuration diagram illustrating a state in which string optimizers, each capable of outputting an equal voltage, are connected in parallel according to an embodiment of the present invention.

Referring to FIGS. 7 and 8, when the inverter (not illustrated) requests a tracking voltage according to MPPT for MPPT control, a string optimizer capable of outputting an equal voltage according to the present invention bypasses an output voltage of each string optimizer when the output voltage is greater than or equal to a maximum output voltage among output voltages of the plurality of string optimizers connected in parallel and boosts the output voltage when the output voltage is less than the maximum output voltage, thereby outputting the same equal voltage as the maximum output voltage of the string optimizer.

As illustrated in FIG. 7, the string optimizer includes a backflow prevention diode D, a booster 1, a switch 3, a comparison unit 5, a determination unit 7, and an oscillator 9.

The backflow prevention diode D is installed between an input terminal PVin+ of an input voltage PVin and an output terminal PVout+ of an output voltage PVout.

The booster 1 is installed between the input terminal PVin+ of the input voltage PVin and the backflow prevention diode D to boost or bypass the input voltage PVin, and boosts the input voltage PVin based on a PWM pulse supplied from the oscillator 9 to output the same equal voltage as the maximum output voltage among the output voltages of the plurality of string optimizers connected in parallel.

The switch 3 turns on/off between the booster 1 and the oscillator 9 to be described below. At this time, the switch 3 is a power switching element such as an FET, an IGBT, or an SCR.

The comparison unit 5 turns on or off the switch 3 by comparing the input voltage PVin input to the booster 1 with an output voltage PVout of an output terminal of the backflow prevention diode. The comparison unit 5 turns off the switch 3 when the input voltage PVin input to the booster 1 is greater than the output voltage PVout of the output terminal of the backflow prevention diode, and turns on the switch 3 when the input voltage PVin+ input to the booster 1 is less than the output voltage PVout− of the output terminal of the backflow prevention diode.

The determination unit 7 compares the output voltage PVout+ of the booster 1 with a maximum output voltage value among the output voltages of the plurality of string optimizers connected in parallel, determines boosting output when the output voltage PVout+ of the booster 1 is lower, and outputs a PWM control signal according thereto from the oscillator 9.

The oscillator 9 generates a PWM pulse according to the PWM control signal, and outputs the PWM pulse to the booster 1 through the switch 3.

Hereinafter, an operation of the string optimizer capable of outputting the equal voltage according to the present invention will be described in detail with reference to the accompanying drawings.

For MPPT control, the inverter (not illustrated) requests a tracking voltage according to MPPT, for example, 700 V.

Then, the comparison unit 5 compares the input voltage PVin+ input to the booster 1 with the output voltage PVout+ of the output terminal of the backflow prevention diode D.

At this time, the maximum output voltage among the output voltages of the plurality of string optimizers connected in parallel is applied to the output terminal of the backflow prevention diode D, and the comparison unit 5 performs comparison therethrough.

That is, when the input voltage PVin+ is 700 V, and the maximum output voltage PVout+ among the output voltages of the plurality of string optimizers connected in parallel applied to the output terminal of the backflow prevention diode D is 700 V, the comparison unit 5 turns off the switch 3 to bypass and output the input voltage PVin+ input to the booster 1 without change.

Then, when the comparison unit 5 turns off the switch 3, the determination unit 7 turns off the oscillator 9.

Conversely, when the input voltage PVin+ is 600 V, and the output voltage PVout+ applied to the output terminal of the backflow prevention diode D is 700 V, the comparison unit 5 determines boosting according to a difference of 100 V and turns on the switch 3.

At the same time, the determination unit 7 determines boosting output by the difference of 100V and outputs a PWM control signal accordingly.

Then, the PWM control signal of the determination unit 7 is applied to the oscillator 9 to generate a PWM pulse, and when the PWM pulse is output to the booster 1 through the switch 3, the booster 1 boosts the input voltage PVin+ by the difference of 100 V to output 700 V.

As a result, a voltage of 700 V is output through the output terminal of the backflow prevention diode D, which becomes the same as an output voltage 700 V of a neighboring string optimizer, and the same optimal equal voltage as the output voltage of the neighboring string optimizer is output.

Therefore, since an optimal equal voltage is output from a string optimizer, the present invention may improve power generation efficiency by maximizing efficiency of the string optimizer.

Even though the embodiments of the present invention have been described above, the scope of a right of the present invention is not limited thereto, and includes all changes and modifications within the range where the present invention is easily changed from the embodiments by those skilled in the art to which the present invention belongs and is recognized as equivalent.

INDUSTRIAL APPLICABILITY

Applicable to a photovoltaic power generation system.

The invention claimed is:

1. A string optimizer connected between an inverter and an output terminal of each of a plurality of solar cell strings included in a photovoltaic power generation system to output an equal voltage, the string optimizer comprising:
   an input processor configured to receive input of generated power from any first solar cell string;
   a booster configured to boost or bypass generated power input through the input processor, and output the generated power;
   an output processor configured to output an output of the booster to a back end; and
   a main controller unit (MCU) configured to perform maximum power point tracking (MPPT) in units of strings to control an operation of the booster so that a voltage corresponding to a maximum current value among current values each detected from an output of each of the plurality of solar cell strings tracks the equal voltage.

2. The string optimizer according to claim 1, further comprising:
a current sensor configured to measure a current value from an output of the output processor; and
a maximum current value detector configured to receive input of current values each measured from an output of each of the plurality of solar cell strings, compare the input current values with a current value measured by the current sensor (hereinafter referred to as a measurement current value), and detect a maximum current value,
wherein the MCU controls an operation of the booster based on the maximum current value and the measurement current value.

3. The string optimizer according to claim 2, wherein the MCU compares the measurement current value with the maximum current value, and controls the booster so that the measurement current value is boosted when a difference between the two values is greater than or equal to a preset reference value.

4. The string optimizer according to claim 1, further comprising a communication unit configured to provide an interface for communication with other string optimizers each connected to an output terminal of each of different solar cell strings,
wherein the MCU shares a measurement current value measured from an output of a solar cell string corresponding to the string optimizer with the other string optimizers through the communication unit, and controls an operation of the booster based on a result of comparison between the measurement current value measured from the output of the solar cell string corresponding to the string optimizer and measurement current values received from the other string optimizers.

5. A photovoltaic power generation system comprising:
a plurality of solar cell strings each including a plurality of photovoltaic (PV) modules;
a plurality of string optimizers each connected to an output terminal of each of the plurality of solar cell strings to perform MPPT in units of the solar cell strings so that an output of a corresponding solar cell string tracks a voltage corresponding to a maximum current value among current values of the plurality of respective solar cell strings as an equal voltage; and
an inverter configured to automatically track a maximum power point (MPP) from an equal voltage output from each of the plurality of string optimizers, inverts a result thereof into AC power, and links the AC power to the system,
wherein the string optimizer comprises:
an input processor configured to receive input of generated power from any first solar cell string;
a booster configured to boost or bypass generated power input through the input processor, and output the generated power;
an output processor configured to output an output of the booster to a back end; and
an MCU configured to perform MPPT in units of strings to control an operation of the booster so that a voltage corresponding to a maximum current value among current values each detected from an output of each of the plurality of solar cell strings tracks the equal voltage.

6. The photovoltaic power generation system according to claim 5, wherein:
the string optimizer further comprises:
a current sensor configured to measure a current value from an output of the output processor; and
a maximum current value detector configured to receive input of current values each measured from an output of each of the plurality of solar cell strings, compare the input current values with a current value measured by the current sensor (hereinafter referred to as a measurement current value), and detect a maximum current value, and
the MCU controls an operation of the booster based on the maximum current value and the measurement current value.

7. The photovoltaic power generation system according to claim 6, wherein the MCU compares the measurement current value with the maximum current value, and controls the booster so that the measurement current value is boosted when a difference between the two values is greater than or equal to a preset reference value.

8. The photovoltaic power generation system according to claim 5, further comprising:
a current sensor connected to an output terminal of each of the string optimizers to measure a current value from an output of a corresponding string optimizer, and configured to feed back the measured current value (hereinafter referred to as a measurement current value) to the string optimizer; and
a maximum current value detector configured to receive input of current values each measured from an output of each of the plurality of solar cell strings, compare the input current values with the measurement current value, and detect a maximum current value,
wherein the MCU controls an operation of the booster based on the maximum current value and the measurement current value.

9. The photovoltaic power generation system according to claim 8, wherein the MCU compares the measurement current value with the maximum current value, and controls the booster so that the measurement current value is boosted when a difference between the two values is greater than or equal to a preset reference value.

10. The photovoltaic power generation system according to claim 5, wherein:
the string optimizer further comprises a communication unit configured to communicate with other string optimizers each connected to an output terminal of each of different solar cell strings; and
the MCU shares a measurement current value measured from an output of a solar cell string corresponding to the string optimizer with the other string optimizers through the communication unit, and controls an operation of the booster based on a result of comparison between the measurement current value measured from the output of the solar cell string corresponding to the string optimizer and measurement current values received from the other string optimizers.

11. The photovoltaic power generation system according to claim 10, further comprising an integration controller connected to the plurality of string optimizers through a communication network to integrate and manage operations of the plurality of string optimizers,
wherein the integration controller comprises:
an internal communication interface configured to provide a communication interface with the plurality of string optimizers and receive state information of each of the plurality of string optimizers;

a storage unit configured to store a control algorithm set in advance to integrate and manage an operation of each of the plurality of string optimizers and data received from each of the plurality of string optimizers, and to store a real-time measurement current value received from each of the plurality of string optimizers; and a controller configured to control boosting or MPPT of each of the string optimizers based on information stored in the storage unit, and to control a boosting operation of each of the string optimizers based on a comparison result of the real-time measurement current values.

12. The photovoltaic power generation system according to claim 11, further comprising a monitoring system configured to monitor an operating state of the photovoltaic power generation system at a remote location through an external network, and to control an operation of the photovoltaic power generation system, wherein the integration controller further comprises an external network communication interface configured to communicate with the monitoring system.

13. The photovoltaic power generation system according to claim 12, wherein:

the external network communication interface delivers state information of each of the plurality of string optimizers received through the internal communication interface to the monitoring system, receives control signals for controlling operations of the plurality of string optimizers from the monitoring system, and delivers the control signals to the controller; and the controller controls the operations of the respective string optimizers based on the control signals.

14. A string optimizer used for a photovoltaic power generation system comprising a PV array including a plurality of PV modules and a plurality of solar cell strings, a connection board provided with a plurality of string optimizers, and an inverter configured to automatically track an MPP, wherein, when the inverter requests a tracking voltage according to MPPT for MMPT control, each of the string optimizers bypasses an output voltage of each of the string optimizers when the output voltage is greater than or equal to a maximum output voltage among output voltages of the plurality of string optimizers connected in parallel and boosts the output voltage when the output voltage is less than the maximum output voltage, thereby outputting the same equal voltage as the maximum output voltage of the string optimizers.

15. The string optimizer according to claim 14, comprising:

a backflow prevention diode installed between an input terminal of an input voltage PVin and an output terminal of an output voltage PVout;

a booster installed between the input terminal of the input voltage PVin and the backflow prevention diode to boost or bypass the input voltage PVin;

a switch configured to turn on or off between the booster and an oscillator;

a comparison unit configured to compare the input voltage PVin input to the booster and the output voltage PVout of the output terminal of the backflow prevention diode to turn on or off the switch;

a determination unit configured to compare the output voltage PVout of the booster with a maximum output voltage among output voltages of a plurality of string optimizers connected in parallel, determine boosting output when the output voltage of the booster is lower, and output a PWM control signal accordingly; and an oscillator configured to generate a PWM pulse according to the PWM control signal of the determination unit, and output the PWM pulse to the booster through the switch.

16. The string optimizer according to claim 15, wherein the booster boosts the input voltage PVin based on the PWM pulse supplied from the oscillator, and outputs the same equal voltage as the maximum output voltage among the output voltages of the plurality of string optimizers connected in parallel.

17. The string optimizer according to claim 16, wherein the comparison unit turns off the switch when the input voltage PVin input to the booster is greater than the output voltage PVout of the output terminal of the backflow prevention diode, and turns on the switch when the input voltage PVin input to the switch is less than the output voltage PVout of the output terminal of the backflow prevention diode.

* * * * *